(No Model.)

A. E. GRIFFITHS.
Apparatus for Condensing Fumes.

No. 235,148. Patented Dec. 7, 1880.

Witnesses.

Inventor.

UNITED STATES PATENT OFFICE.

AMOS E. GRIFFITHS, OF PHILADELPHIA, PENNSYLVANIA.

APPARATUS FOR CONDENSING FUMES.

SPECIFICATION forming part of Letters Patent No. 235,148, dated December 7, 1880.

Application filed June 4, 1880. (No model.)

*To all whom it may concern:*

Be it known that I, AMOS E. GRIFFITHS, a citizen of the United States, residing at Philadelphia, in the county of Philadelphia and State of Pennsylvania, have invented certain new and useful Improvements in Apparatus for Condensing Fumes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Gases from metallurgic furnaces have heretofore been condensed and the smoke therefrom purified by passing them through a spray of water and through water dropping from partitions placed in the condenser, as shown in the patent of W. J. Johnson of February 18, 1873, No. 136,066. It has also been customary to inject the gases from such furnaces into a vessel containing water or other liquid, and then agitating such liquid by means of a wheel placed in said reservoir, as shown in the patent of R. C. Bocking of July 3, 1866, No. 55,994; but my invention relates to an improved apparatus to be used in connection with such furnaces and other devices employed in the treatment of argentiferous and other ores, and also in connection with retorts, chambers, and kettles employed in the manufacture of chemicals, fertilizers, soap, and for rendering tallow and other substances from which an offensive odor arises, it being designed as an improvement upon one for which a patent was granted to me on the 27th of March, 1866, No. 53,440; and the objects of my present improvements are, first, to provide an apparatus that may be applied to furnaces used in the treatment of ores containing precious and other metals, for the purpose of condensing the vapors arising therefrom and saving any small particles of metal that may be contained therein by depositing them in a reservoir containing water or other liquid; and, second, to adapt such an apparatus for use in connection with furnaces, retorts, chambers, kettles, and other vessels used in the manufacture of chemicals, fertilizers, and soap, and in the rendering of tallow and other substances from which offensive odors arise while undergoing such treatment. I attain these objects by the mechanism illustrated in the accompanying drawings, in which—

Figure 1:
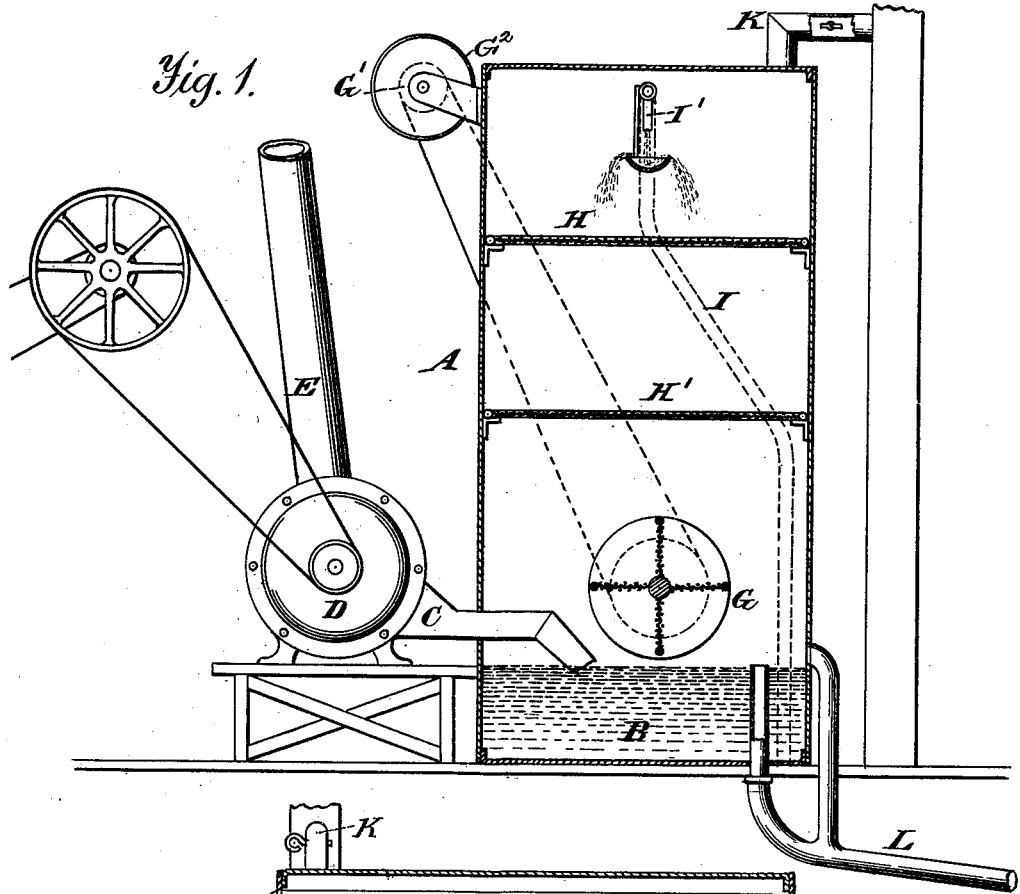
Figure 2:
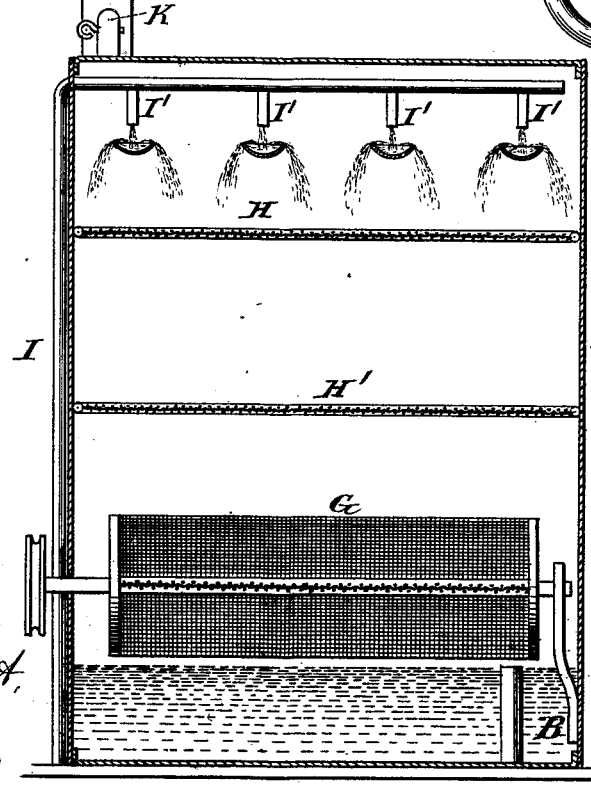

Figure 1 is an elevation of my improved apparatus, partly in section, showing a reservoir for the reception of the gases arising from metallurgic furnaces and fumes arising from retorts and kettles in which chemicals are treated and tallow and other substances rendered, a fan for drawing the gases and fumes from the furnace, retort, or kettle, and forcing them into the condensing-reservoir, pipes through which the gases and fumes pass to and from the fan, a water-bath within the reservoir, a rotating wire-gauze screen for agitating the gases and fumes, and pipes for conducting water to and from the reservoir; and Fig. 2 is a transverse sectional elevation, showing the devices for producing a shower-bath for the gases and fumes within the reservoir.

Similar letters refer to similar parts in both views.

In constructing devices of this character there is provided a reservoir, or what may be termed a "condensing-tank," A, in the lower portion of which there is maintained a bath of water or other liquid, B, into which any particles of metal which may be carried into it from a metallurgic furnace by the escaping gases fall, and from which they may be removed from time to time through a man-hole or other suitable opening. Into this bath the gases from the furnace and the fumes from other devices are also carried through a pipe, C, the outer end of which is attached to and in communication with a fan, D. This fan is driven by any prime mover by means of belts, as shown, or in any other convenient manner. The arrangement of the fan D, and of the whole apparatus, with reference to the furnace, retort, or kettle in connection with which it is to be used, is such that the pipe E, which leads the gases and fumes to it, may be attached to the top of the furnace, retort, or kettle, or to some other suitable portion thereof, so that the fan may take away such gases and fumes and force them through a pipe, C, into the bath of water in the reservoir or condenser A.

For the purpose of agitating the gases and vapors as they arise from the bath, there is placed in the reservoir A a rotating screen, G, which is driven by a pulley placed upon its outer end, around which passes a belt, which extends to and over a pulley, G', placed upon a shaft journaled in bearings attached to the reservoir A, upon which last-named shaft is a pulley, G², which may be driven by a pulley on the shaft of the fan, or by any other suitable means.

Above the rotating screen G there are two or more wire-gauze diaphragms, H H', which extend across the reservoir, and are for the purpose of subdividing the gas and vapors as they ascend, so that they may be condensed by being brought into contact with shower-baths of water introduced through a pipe, I, the outer end of which may be connected to a pump or other source of supply. This pipe extends across the reservoir, within the same, and is provided with a series of outlets, I', which conduct water into a trough, pipe, or a series of cups suspended from the reservoir, and from these the water falls in the form of a shower-bath upon the diaphragm H, through which it passes through H', and falls into the lower portion of the reservoir A, in doing which a portion of it comes in contact with the revolving screen G, by which means it is sprayed among the ascending gases and fumes, which are to a great extent condensed thereby, and by the falling water before it reaches the screen.

The wire-gauze diaphragms have the effect to retard the ascent of the gases and vapors, as well as to comminute the falling water, and thus to bring the two bodies into more intimate contact with each other, and so facilitate the condensation of the former.

For the purpose of conducting off the gases and vapors, should any remain uncondensed, there is placed upon the upper portion of the reservoir A, so as to communicate with the interior thereof, a pipe, K, in which there is placed a valve, which may be opened and closed at pleasure, and thus, when desired, permit whatever may remain uncondensed in said reservoir to escape into the chimney of the furnace, or it may be conducted to the furnace and caused to pass through the incandescent fuel upon its grate, and thus be prevented from producing any injurious effect upon the vegetation of the surrounding country and from annoying or injuring the public.

As a means of preventing the water from rising too high in the reservoir A, there is provided an overflow-pipe, L, which rises to the required distance therein, or is attached to the outside thereof at the requisite height, so that when the water reaches the open mouth thereof it will flow out, and thus the requisite amount of water is maintained therein, while it is prevented from rising too high.

Having thus described my improvements, what I claim, and desire to secure by Letters Patent, is—

1. In combination with a metallurgic furnace in which ores are treated, a condenser having within it a bath of water or other liquid, a rotating screen, wire-gauze diaphragms, and apparatus, substantially such as is herein described, for causing water in a finely-comminuted form to fall through the ascending gases or fumes as they rise in the condenser, for the purpose of aiding the condensation of said gases and fumes, as set forth.

2. In an apparatus for condensing the gases from metallurgic furnaces and the fumes from retorts, kettles, and other devices used in the manufacture of chemicals, and in rendering tallow and other substances, the combination of the condenser A, having in it a liquid-bath, revolving screen G, wire-gauze diaphragms H H', water-induction pipe I, outlet-pipes L, cups, or a pipe or trough, for distributing the water, an overflow-pipe, a fan, D, and pipes for directing the gases and fumes to the condenser, the parts being arranged for joint operation, substantially as set forth.

In testimony whereof I affix my signature in presence of two witnesses.

AMOS E. GRIFFITHS.

Witnesses:
JOSEPH G. HIBBS,
WM. M. MCKNIGHT.